UNITED STATES PATENT OFFICE.

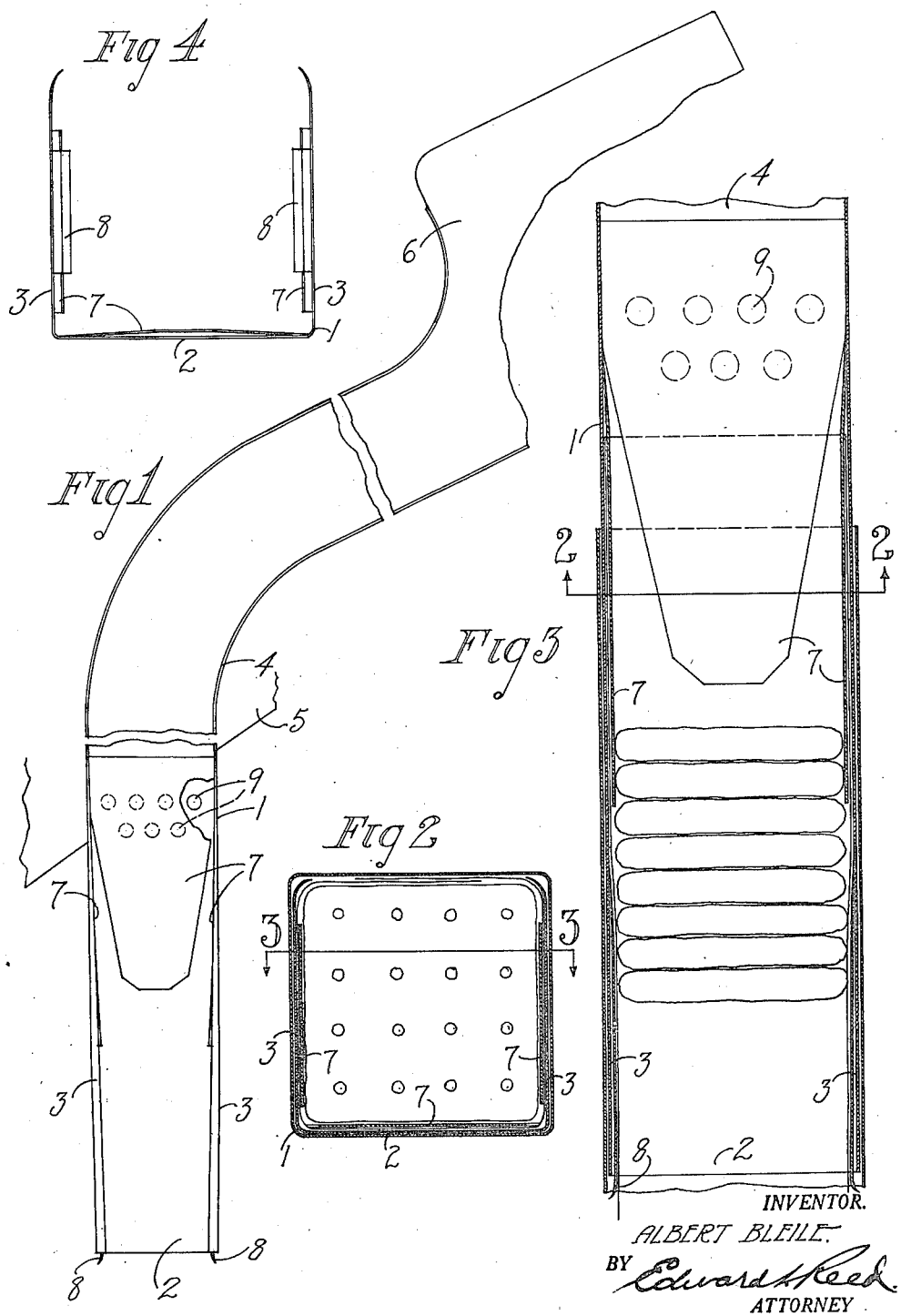

ALBERT BLEILE, OF DAYTON, OHIO.

DEVICE FOR FILLING END-OPENING CONTAINERS.

1,300,691.   Specification of Letters Patent.   Patented Apr. 15, 1919.

Application filed June 27, 1918. Serial No. 242,330.

*To all whom it may concern:*

Be it known that I, ALBERT BLEILE, a citizen of the United States, residing at Dayton, in the county of Montgomery and State of Ohio, have invented certain new and useful Improvements in Devices for Filling End-Opening Containers, of which the following is a specification, reference being had therein to the accompanying drawing.

This invention relates to a device for filling end-opening containers.

The device of the invention is designed primarily for packing the hard bread of the army, commonly known as hard-tack, in the containers prescribed by the Government. These containers are, for the most part, of metal and have the seams soldered to exclude both moisture and gas. Each container is of a size and shape to accommodate about twenty pieces of the hard bread when packed on edge and face to face. When the containers are ready to be filled they are opened at one end only and the bread must be wrapped and inserted in a wrapped condition in the container. Inasmuch as the containers are relatively small in cross section, much difficulty has been experienced in inserting the bread therein. The hard bread is baked in small squares not unlike the well known square cracker and, while these pieces of hard bread are not technically known as cakes, they may be properly so called, and I wish it to be understood that the term "cake" or "cakes" as herein employed, is intended to include not only the hard bread but also ordinary cakes or crackers, or any other article or articles of such a size and shape that they can be packed in a container in the manner hereinafter described.

The object of the invention is to provide a device by means of which cakes may be assembled, wrapped and inserted in a container through the end thereof.

A further object of the invention is to provide such a device which will be so simple in its construction and operation that the containers may be very quickly filled.

To this end it is also an object of the invention to provide such a device which will have means to support the wrapper while the cakes are being assembled thereon; which will have means to support the cakes in substantially upright positions prior to and during the wrapping operation; and which will have means for clearing it of crumbs which may fall from the cakes.

Other objects of the invention will appear as the device is described in detail.

In the accompanying drawings Figure 1 is a plan view, partly broken away, of a filling device embodying my invention; Fig. 2 is a transverse section taken on the line 2—2 of Fig. 3; Fig. 3 is a horizontal section taken on the line 3—3 of Fig. 2 looking in the direction of the arrows; and Fig. 4 is an end elevation of the device.

In these drawings I have illustrated one embodiment of the invention and have shown the same as comprising a structure 1 adapted to receive the cakes and support them on edge and face to face while they are being wrapped, and to be inserted together with the cakes lengthwise into a container. The structure may be of any suitable construction and may be supported and the cakes delivered thereto in various ways. As here shown, it comprises a bottom wall 2 and side walls 3 and forms, in effect, a continuation of a chute or guideway 4, which is preferably supported on a table or other suitable fixture 5, and extends to a point where there is to be found a supply of cakes. The present device is used in connection with a conveyer on which are supported trays filled with the cakes which are to be packed, and the chute or guideway 4 is provided with a flared end 6 to facilitate the alining of the cakes in the chute by the operator, when they are removed from the trays and slid into the chute on edge and face to face. The chute, which is of considerable length, may be filled with the cakes and the operator will slide enough cakes to fill the container from the chute into the filling structure, wrap the same and insert the wrapped cakes into the container, by placing the container over the structure and the cakes, this operation being repeated until the cakes in the chute are exhausted, after which the chute is again filled from a tray on the conveyer. The filling structure is preferably rigidly mounted on a table 5 and projects beyond the edge of the table a distance sufficient to permit the container to be placed over the same. This arrangement also enables the operator to face the filling structure while filling the containers, which is the most convenient position for rapid work.

The cakes are wrapped before being placed in the container and the wrapper usually consists of a sheet of paper which has been treated in the usual manner. This sheet is fitted into the trough-like structure 1 before the cakes are placed therein, and after the cakes have been placed in the structure upon the wrapping sheet the latter is folded about them. In order that the cakes may be slipped into the filling structure onto the wrapper without engaging or disarranging the edge thereof, I have provided holding devices for the wrapper, which are of such a character that the latter can be very quickly and easily placed in position thereon and removed therefrom. As here shown, these holding devices comprise resilient clips or plates 7 which are secured at their ends to the respective side and bottom walls of the structure near that end thereof adjacent to the chute 4 and extend inwardly toward the discharge end of the structure. These clips, preferably, taper slightly toward their forward ends and have their rear ends such a width as to cover a large part of that portion of the wrapper which lies within the filling structure. The clips are so arranged that the forward ends thereof will normally be spaced away from the adjacent walls, thus permitting the wrapper to be very easily inserted back of the clips, and when so inserted, the edges of the wrapper are protected in such a manner that the cakes can be slipped from the chute into the filling structure without engaging the edge of the wrapper. The cakes will spring the clips outward toward the respective walls but, inasmuch as there is some clearance between the edges of the cakes and the walls of the structure, the clips will not be pressed against the wrapper tight enough to prevent the same from being readily slipped out from between the clips and the walls. In placing the wrapper in the filling structure, the two lateral edges thereof are caused to project above the side walls of the structure. After the cakes have been moved into the structure the upwardly extending portions of the wrapper are folded across the tops of the cakes, as shown in Fig. 2, the front end of the wrapper is folded, and the container is slipped over the end of the structure. To retain the cakes on edge prior to and during the folding of the wrapper, I have provided near the forward end of the structure resilient clips or light springs 8 which are secured at their inner ends to the side walls of the structure and project forwardly therefrom. The springs 8 diverge from the side walls 3 so as to offer a slight resistance to the forward movement of the cakes, which resistance is sufficient to prevent the forward cakes from falling flat onto the bottom of the structure. It is not necessary that the cakes should be retained in vertical positions but it is sufficient if they be retained on edge, even though they may be tilted considerably from the vertical. The pressure of the springs 8 is sufficient to so retain the cakes on edge, but is not sufficient to offer any substantial resistance to the passage of the cakes when the wrapped package is withdrawn from the structure after having been inserted in the container.

In the present construction I have shown the side walls of the filling structure of a height greater than the height of the cakes and have turned the upper edges of these side walls inwardly so that they lie above the adjacent edges of the cakes. In the present instance I have not bent the edges of the side walls inwardly for their full length, but have curved the upper edges at the forward end of the structure and have gradually decreased the curvature toward the rear or outer end of the structure. The curved edges of the structure are spaced apart a distance sufficient to permit the manipulation of the cakes and of the wrapper, but they prevent the edge of the container from coming in contact with and tearing the wrapper as the container is placed about the structure and the wrapped package of cakes. More or less crumbs and dust will fall from the cakes as they are being handled in the filling structure and, to prevent these crumbs and this dust from accumulating behind the clips 7 and thus interfering with their operation, I have provided the bottom wall 2 of the structure with a series of openings 9 which lie beneath the bottom clip 7 and near the rear end thereof, so that the crumbs as they are worked rearwardly by the wrappers will pass through these openings and thus escape from the structure.

The construction and operation of the device will be readily understood from the foregoing description, and it will be apparent that I have provided a filling structure of this character which, while exceedingly simple in its construction and manner of use, is, nevertheless, highly efficient and enables the cakes to be wrapped and packed very rapidly. Further, the device is such that it can be constructed at a very low cost, thus enabling large numbers of filling devices to be installed without heavy expense. Moreover, the device is of such a character that it is not liable to get out of order or to be rendered inoperative and, hence, will not, for such reasons, cause an interruption of the work.

While I have shown and described one embodiment of my invention, I wish it to be understood that I do not desire to be limited to the details thereof, as various modifications will occur to a person skilled in the art.

Having now fully described my invention, what I claim as new and desire to secure by Letters Patent, is:

1. A device of the character described comprising a cake receiving and supporting structure mounted on a fixed support and projecting beyond the same to permit an open ended container to be placed about said structure, said structure being adapted to support on edge and face to face a quantity of cakes sufficient to substantially fill said container, said structure having its rear end open to permit the cakes to be moved onto the same, having its forward end unobstructed, and having an opening along one side thereof to permit the cakes to be engaged by the finger of the operator and withdrawn therefrom along with the container when the latter is removed from said structure.

2. A device of the character described comprising a structure to support a plurality of cakes on edge and face to face, said structure having an opening along one edge thereof to permit the cakes to be manipulated thereon and being adapted to extend lengthwise into a container for substantially the full length of said container, said structure also having means to retain said cakes in stationary upright positions while said container is being placed about the same, and having its forward end unobstructed to enable the cakes to be withdrawn therefrom along with said container when the latter is removed from said structure.

3. A device of the character described comprising a structure adapted to extend lengthwise into a container, and to support on edge and face to face a quantity of cakes sufficient to substantially fill said container, and a device to retain said cakes on edge prior to their insertion in said container, said device being yieldable to permit said cakes to be withdrawn from said structure along with said container when the latter is withdrawn from said structure.

4. A device of the character described comprising a structure adapted to extend lengthwise into a container and to support a quantity of cakes sufficient to substantially fill said container, said structure having a bottom wall and side walls and having the upper edges of said side walls turned inwardly above the adjacent edges of said cakes and spaced apart to form an opening to permit said cakes to be manipulated on said structure.

5. A device of the character described comprising a structure to support a plurality of cakes on edge and face to face and adapted to extend lengthwise into a container for said cakes, said structure having a bottom wall and side walls and having the upper edges of said side walls turned inwardly above the adjacent edges of said cakes, and strips of resilient material secured to said side walls near the forward ends thereof and beneath said inturned edges, and adapted to resist the forward movement of the cakes but to yield to permit said cakes to be withdrawn from said structure.

6. A device of the character described comprising a structure to support a plurality of cakes on edge and face to face and adapted to extend lengthwise into a container for said cakes, and means to support a wrapper other than said container on said structure in a position to receive said cakes.

7. A device of the character described comprising a structure to support a plurality of cakes on edge and face to face and adapted to extend lengthwise into a container for said cakes, and means to support a wrapper other than said container on said structure in a position to receive said cakes, and to prevent said cakes from engaging the edge of said wrapper as said cakes are moved onto said structure.

8. A device of the character described comprising a structure to support a plurality of cakes on edge and face to face and adapted to extend lengthwise into a container for said cakes, and means to support a wrapper on said structure in a position to receive said cakes and prevent said cakes from engaging the edge of said wrapper as said cakes are moved onto said structure, said structure having means to prevent the edge of said container from engaging said wrapper as said container is placed about said structure and the wrapped package of cakes.

9. In a device of the character described, a structure to support a plurality of cakes on edge and face to face and adapted to extend lengthwise into a container for said cakes, said structure comprising bottom and side walls, and plates secured to said bottom and side walls and extending forwardly therefrom to receive the edge of a wrapper between them and the respective walls.

10. In a device of the character described, a structure to support a plurality of cakes on edge and face to face and adapted to extend lengthwise into a container for said cakes, said structure comprising bottom and side walls, and resilient clips secured to the respective walls of said structure near the rear end thereof and diverging forwardly therefrom to receive between them and said walls the edge of a wrapper.

11. In a device of the character described, a structure to support a plurality of cakes on edge and face to face and adapted to extend lengthwise into a container for said cakes, said structure comprising bottom and side walls, and resilient clips secured to the respective walls of said structure near the rear end thereof and diverging forwardly therefrom to receive between them and said walls the edge of a wrapper, and other resilient clips secured to the side walls of said structure near the forward end thereof to engage the cakes and retain the same on edge.

12. In a device of the character described, a structure to support a plurality of cakes on edge and face to face and adapted to extend lengthwise into a container for said cakes, said structure comprising bottom and side walls, and plates secured to said bottom and side walls and extending forwardly therefrom to receive the edge of a wrapper between them and the respective walls, said bottom wall having openings formed therein beneath the plate secured thereto.

13. A device of the character described comprising a structure substantially U-shaped in cross section and having its upper edges curved inwardly and spaced apart.

14. A device of the character described comprising a structure substantially U-shaped in cross section and guard plates secured to the inner surfaces of the walls of said structure and extending forwardly to receive the edge of a wrapper between the same and said walls.

15. A device of the character described comprising a substantially U-shaped structure having its upper edges turned inwardly, guard plates secured to the walls of said structure near the rear end thereof to receive the edge of a wrapper between the same and the respective walls, and resilient retarding devices secured to said structure near the forward end thereof.

16. A device of the character described comprising a cake receiving and supporting structure secured to a fixed support and adapted to have a tubular container for cakes placed about the same, and means for supporting a wrapper other than said container on said structure in a position to receive said cakes.

17. A device of the character described comprising a cake receiving structure, rigidly secured in a substantially horizontal position to a supporting structure, having its upper edges curved inwardly, guard plates arranged within said structure to receive the edge of a wrapper between the same and the respective walls of said structure, and means for retaining said cakes on edge in said structure.

In testimony whereof, I affix my signature hereto.

ALBERT BLEILE.